(12) United States Patent
Iwasaki

(10) Patent No.: US 7,204,561 B2
(45) Date of Patent: Apr. 17, 2007

(54) CAP WITH A ROUGHLY DISK SHAPE AND A WHEEL INCLUDING THE SAME

(75) Inventor: Minoru Iwasaki, Okazaki (JP)

(73) Assignee: Japan Active Co., Ltd., Osaka (JP)

( * ) Notice: Subject to any disclaimer, the term of this patent is extended or adjusted under 35 U.S.C. 154(b) by 0 days.

(21) Appl. No.: 10/929,957

(22) Filed: Aug. 30, 2004

(65) Prior Publication Data

US 2005/0046268 A1 Mar. 3, 2005

(30) Foreign Application Priority Data

Aug. 29, 2003 (JP) ............................. 2003-270881

(51) Int. Cl.
*B60B 11/00* (2006.01)
(52) U.S. Cl. ................ 301/37.12; 301/37.101
(58) Field of Classification Search ........... 301/37.101, 301/37.28, 37.102, 37.31, 37.12, 108.1, 108.2, 301/108.3
See application file for complete search history.

(56) References Cited

U.S. PATENT DOCUMENTS

| | | | | |
|---|---|---|---|---|
| 2,249,889 A | * | 7/1941 | Dotson | 301/64.303 |
| 3,089,738 A | * | 5/1963 | Steiner | 384/473 |
| 3,649,080 A | * | 3/1972 | Molinare | 301/108.1 |
| 4,781,419 A | * | 11/1988 | Boothe | 301/108.3 |
| 4,932,725 A | * | 6/1990 | Koschinat | 303/1 |
| 4,974,909 A | * | 12/1990 | Patti et al. | 301/37.31 |
| 4,991,681 A | * | 2/1991 | Paulson | 180/275 |
| 5,195,807 A | * | 3/1993 | Lederman | 301/108.1 |
| 5,205,617 A | * | 4/1993 | Hoffmann | 301/108.1 |
| 5,957,542 A | * | 9/1999 | Boothe et al. | 301/37.25 |
| 6,848,751 B1 | * | 2/2005 | Yuan | 301/37.25 |
| 2001/0048241 A1 | * | 12/2001 | Yoshimura | 301/37.101 |
| 2002/0125761 A1 | * | 9/2002 | Matushita | 301/37.25 |

* cited by examiner

*Primary Examiner*—Jason R. Bellinger
(74) *Attorney, Agent, or Firm*—Jordan and Hamburg LLP

(57) ABSTRACT

A is attached to a hollow portion in a wheel, an inner peripheral groove is provided on an inner peripheral surface of the hollow portion and an outer peripheral groove is provided on the outer peripheral surface of the cap, forming a single annular space. Into the annular space a C-spring or an O-ring is inserted, thereby attaching the cap to the wheel. Further, the O-ring is sandwiched between the annular surface of the wheel and the inner surface of the cap, or magnets are sandwiched therebetween, for eliminating rattling.

11 Claims, 3 Drawing Sheets

PRIOR ART

CAP WITH A ROUGHLY DISK SHAPE AND A WHEEL INCLUDING THE SAME

BACKGROUND OF THE INVENTION

1. Technical Field of the Invention

The present design relates to a wheel for an automobile; more specifically, it relates to the shape of a cap attached to an aluminum wheel configured so as to cover a center hole for attaching to the axle and onto which a seal or plate imprinted with a mark or emblem or the like is adhered and displayed, and to the attachment part of said cap.

2. Description of the Background Art

FIG. 6 shows a conventional configuration. Conventionally, there is a cap 8 having a plurality of finger parts 8b, and the finger parts 8b are inserted into a wheel 7, being deformed in the process, so that a nail part 8a of the finger parts 8b becomes interlocked with a groove 7a on the wheel 7.

Meanwhile, when the cap 8 is to be removed, a tool is applied from the inside, and a hammer or the like in struck against the end surface of such tool; this operation is difficult and is difficult to work.

Further, with the conventional cap, a base 8c of the finger 8b can easily break; once it breaks it can no longer be used. Because a cap is relatively conspicuous, a customer who cares about a car's external appearance often will not just replace one cap with a new article, but will replace all caps, in order to keep an even appearace, meaning that unnecessary time, resources and money are spent on the work.

SUMMARY OF THE INVENTION

The present design was conceived in order to solve the above problems of the conventional technology; its object is to provide an easily attachable and removable cap that does not have weak portions vulnerable to breaking.

Another object is to provide a wheel having a cap that can be easily attached and removed and does not have any portions vulnerable to breaking.

A cap is attached to a hollow portion of a wheel, grooves are provided on both the inner peripheral surface of the hollow part and the outer peripheral surface of the cap, and when the cap is attached to the wheel a single annular space is formed.

By inserting a C-spring or O-ring into such annular space the cap is attached to the wheel.

Further, an O-ring is sandwiched between an annular surface of the wheel and inner surface of the cap; the repelling force of the O-ring eliminates the slight movement of the cap with respect to the wheel (hereinafter referred to as "rattling").

Alternatively, a magnet is sandwiched between an annular surface of the wheel and inner surface of the cap; the magnetic force of the magnet eliminates rattling.

The present design provides a cap that does not have portions vulnerable to breaking and a wheel to which such a cap can be attached.

Thus, with the exception of cases where the cap itself collides with an obstacle while the automobile is traveling, the cap is not damaged during the attachment or removal of cap, eliminating the need for unnecessary replacement work.

Further, because there is no unnecessary replacement of caps, cap material is not wastefully used, and unnecessary expenses are avoided.

PREFERRED EMBODIMENTS

Figure 1:
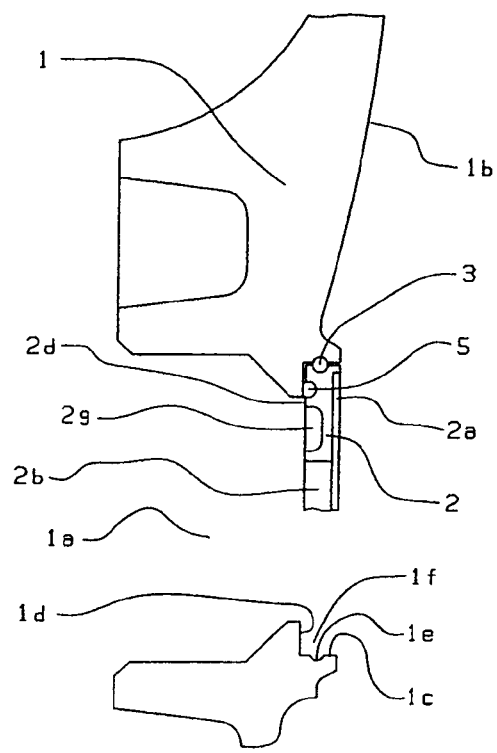
FIG. 1 is a partial cross section of a wheel showing a portion of a wheel in a state in which a cap is attached.

A cap that attaches to a center hole in a wheel has a roughly disk shape and has an outer peripheral groove along the outer peripheral surface of said disk shape.

Because this is a cap with a roughly disk shape, it is easy to manufacture and does not have parts susceptible to breaking. The outer peripheral surface refers to a surface at the maximum external diameter of the roughly disk; when the cap has been attached to a wheel, an outer peripheral groove along the outer peripheral surface of the cap and an inner peripheral groove along the inner peripheral surface of the wheel meet, thus forming a single annular space.

The cap has a recessed portion on one disk surface and a central hole in a central portion of the disk shape.

The recessed portion is for attaching a seal or plate imprinted with a mark or emblem, and the central hole is for facilitating the work of attaching such seal or plate and or processing the cap.

The cap may have an inner surface groove on the inner surface, such surface being the surface that attaches to the wheel.

This design provides a shape that allows for easy adhesion of an O-ring, allowing for an O-ring to be sandwiched between the annular surface of a wheel and the inner surface of a cap.

The cap may have a magnet attached to the inner surface thereof.

This design provides a cap with a magnet sandwiched between an annular surface of a wheel and inner surface of the cap.

An automobile wheel has a hollow portion formed by the inner peripheral surface and annular surface at the end of a center hole on the cosmetic surface side. In addition, the wheel has the distinctive feature having an inner peripheral groove on the above mentioned inner peripheral surface.

This design provides a hollow portion for attaching a cap to a wheel. When a cap has been attached to a wheel, an inner peripheral groove along the inner peripheral surface of the wheel and un outer peripheral groove along the outer peripheral surface of the cap meet, thus forming a single annular space.

A wheel has a cap to which a C-spring may be inserted into the annular space formed by said wheel inner peripheral groove old said cap outer peripheral groove.

This design provides a configuration such that a C-spring is inserted in the annular space formed between the inner peripheral groove on the wheel inner peripheral surface and the outer peripheral groove of the cap outer peripheral surface, thus fixing the cap to the wheel.

A wheel has a cap to which an O-ring may be inserted into the annular space formed by the wheel inner peripheral groove and the cap outer peripheral groove.

This design provides a configuration such that an O-ring is inserted in the annular space formed between the inner peripheral groove on the wheel inner peripheral surface and the outer peripheral groove of the cap outer peripheral surface, thus fixing the cap to the wheel. In such a case, it is preferable to chamfer the angled portion between the cap outer peripheral surface and inner surface to provide an incline, as this allows an O-ring to be inserted without damage.

Either an O-ring or a magnet may be provided between the cap inner surface and wheel annular surface.

With such a configuration, an O-ring is sandwiched between the wheel annular surface and cap inner surface, and the repelling force of the O-ring eliminates rattling, or else, a magnet is sandwiched between the wheel annular surface and cap inner surface, and the magnetic force of the magnet eliminates rattling.

Embodiment 1

A first embodiment according to the present design will be explained with reference to FIG. 1. A wheel 1 has a center hole 1a in a central portion thereof; on the cosmetic surface 1b side of the center hole 1a a hollow portion 1f formed from an inner peripheral surface 1c and an annular surface 1d is provided; and the inner peripheral surface 1c has an inner peripheral groove 1e having a bow-shaped cross section.

Figure 3:
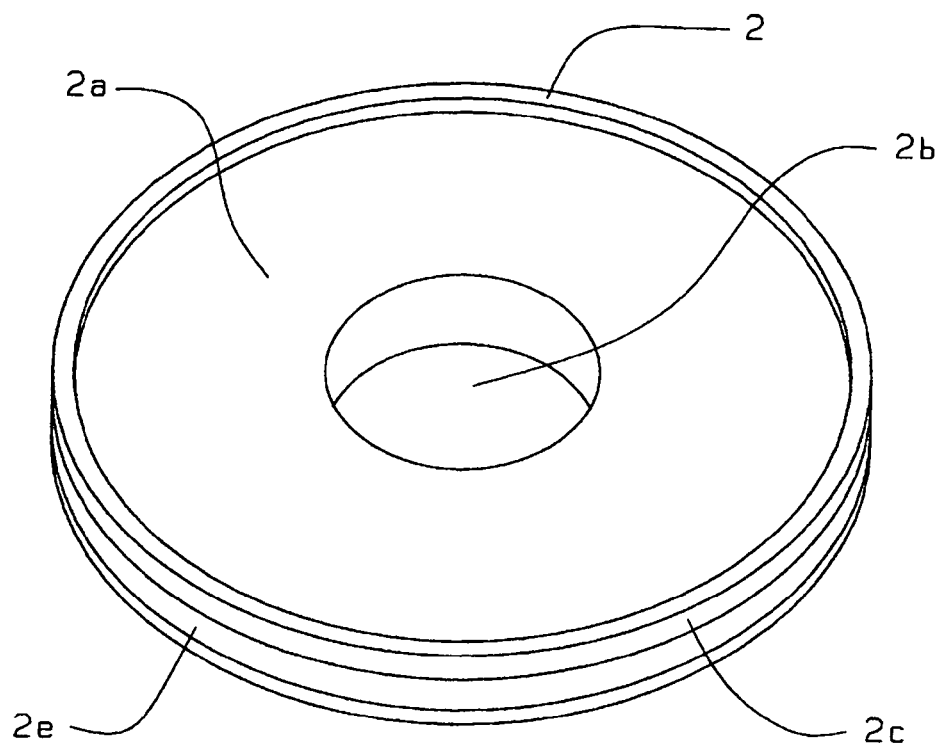
FIG. 3 is a perspective view of a cap as seen from the recessed portion side.
Figure 4:
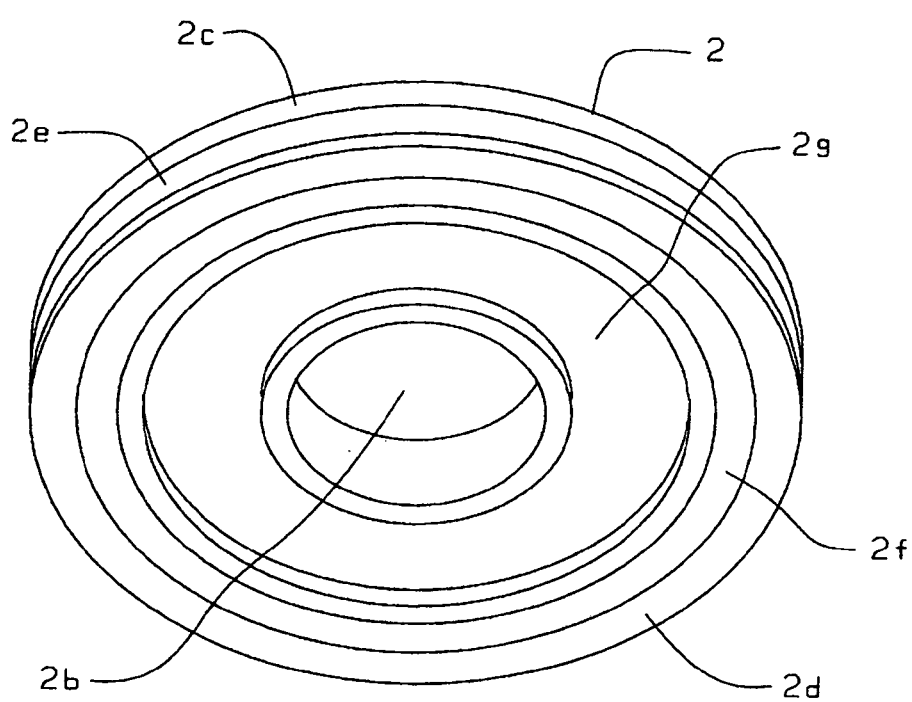
FIG. 4 is a perspective view of a cap as seen from the inner surface side.

As shown in FIGS. 3 and 4, a cap 2 has a recessed portion 2a on one surface of a disk-shaped plate and a central hole 2b in a central portion thereof; it further has an outer peripheral groove 2e having a bow-shaped cross section on an outer peripheral surface 2c and an inner surface groove 2f having a bow-shaped cross section on an inner surface 2d. In addition, a hollowed-out portion 2g has been provided on the inner surface 2d for purposes of weight reduction. Thus the cap 2 is overall in a roughly disk shape.

Figure 5:
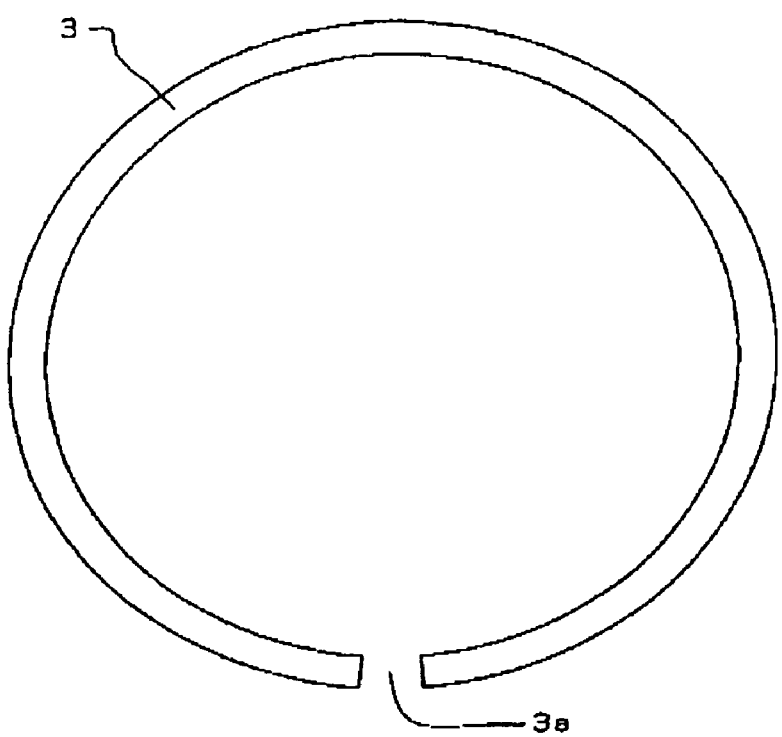
FIG. 5 is a plan view of a C-spring.
Figure 6:
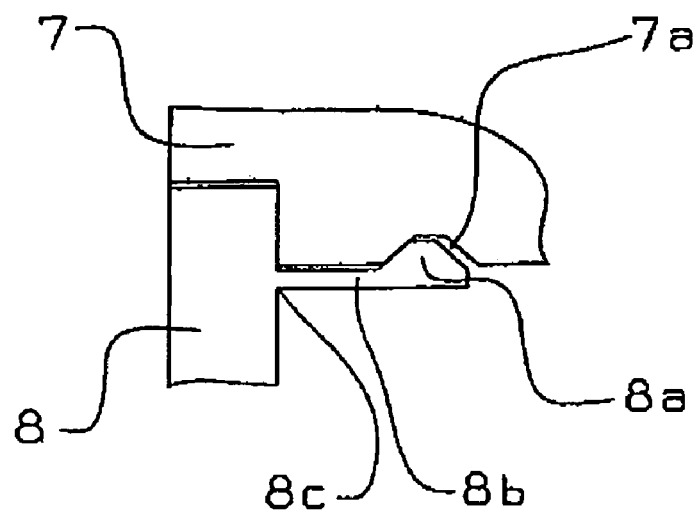
FIG. 6 is a partial cross section of a wheel in a state in which a conventional cap is attached.

As shown in FIG. 5, a C-spring 3 is spring steel wire bent into a circular shape with a cutaway portion 3a provided.

In the present embodiment, before the cap 2 is attached to the wheel 1, the C-spring 3 is inserted into the inner peripheral groove 1e of the wheel 1, and an adhesive is used to adhere an O-ring 5 to the inner surface groove 2f of the cap 2.

When the cap 2 is inserted into a hollow portion 1f of the wheel 1, the C-spring 3 elastically deforms and opens and when the O-ring 5 comes in contact with the annular surface 1d of the wheel 1 and becomes distorted, the C-spring 3 is accommodated within the annular space formed between the inner peripheral groove 1e and the outer peripheral groove 2e.

After once becoming distorted, the O-ring 5 repulses and pushes back against the cap 2; thus even if there is a gap between the annular space formed by the inner peripheral groove 1e and the outer peripheral groove 2e and the C-spring 3, rattling is still prevented.

Embodiment 2

Figure 2:
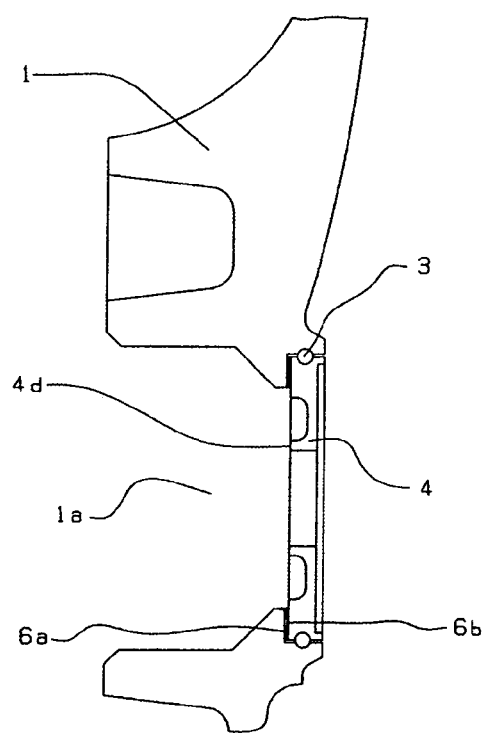
FIG. 2 is a partial cross section of a wheel in a state in which a cap is attached.

Next, a second embodiment according to the present design will be explained with reference to FIG. 2. The wheel 1 in this embodiment is the same as the wheel 1 described in the first embodiment, so explanation thereof shall be omitted.

Unlike the cap according to the first embodiment, which has an inner surface groove 2f for attaching the O-ring 5 to the inner surface 2d, a cap 4 according to this embodiment does not have a groove on its inner surface 4d but a magnet 6b is adhered thereto with an adhesive.

In the present embodiment, a magnet 6a is adhered beforehand to the annular surface 1d of the wheel 1 using an adhesive, and a C-spring 3 is inserted beforehand into the inner peripheral groove 1e of the wheel 1.

When the cap 4 is inserted into the hollow portion 1f of the wheel 1 and the C-spring 3 elastically deforms and opens, and when the magnet 6b attached to the cap 4 comes in contact with the magnet 6a attached to the annular surface 1d the wheel 1, then the C-spring 3 is accommodated within the annular space formed by the inner peripheral groove 1e and the outer peripheral groove 2e.

Because the magnetic forces of the magnet 6b and magnet 6a attract each other, even if there is a gap between the annular space formed by the inner peripheral groove 1e and the outer peripheral groove 2e and the C-spring 3, rattling is still prevented.

The present design relates to a cap that can be easily attached to mid removed from a wheel and that does not have weak portions susceptible to breaking, and to a wheel to which such a cap is attached, and thus the present design is applicable to the industrial field of manufacturing and marketing automobile wheels, in particular, aluminum wheels, and to caps attached to a wheel.

The invention claimed is:

1. A cap capable of being attached to a center hole of a wheel;

the center hole of the wheel including a first wheel annular surface which is an axially extending inner surface, the first wheel annular surface including a first wheel annular groove which opens radially inwardly;

said cap being a roughly disk shape and comprising:

a first cap annular surface which is an axially extending outer surface, said first cap annular surface including a first cap annular groove that is adapted for opposing the first wheel groove, the first cap annular groove being of a semicircular cross sectional shape that opens radially outwardly;

opposing second and third cap annular surfaces respectively defining radially extending inner and outer surfaces;

said second cap annular surface including a second cap annular groove which opens axially outwardly;

an axially extending central hole in a central portion of said cap, said central hole extending through said second and third cap annular surface; and said cap being without a hook axially extending from said cap for connecting said cap to the wheel.

2. A cap according to claim 1, wherein said cap farther comprises an outwardly opening annular recessed portion on said third cap surface.

3. A wheel comprising:

a wheel unit including a center hole, the center hole including a first wheel annular surface which is an axially extending inner surface, said first wheel annular surface including a first wheel annular groove, the first wheel annular groove being of a semicircular cross sectional shape which opens radially inwardly;

a cap including a first cap annular surface which is an axially extending outer surface, said first cap annular surface including a first cap annular groove that is adapted for opposing the first wheel annular groove, the first cap annular groove being of a semicircular cross sectional shape that opens radially outwardly;

said cap being disposed on said wheel to form a first annular space between said first wheel annular groove and said first cap annular groove;

a C-spring disposed in said first annular space, said C-spring having a circular shape with a circumferentially extending cutaway portion;

said cap including an axially extending central hole in a central portion of said cap; and said cap being without a hook axially extending from said cap for connecting said cap to the wheel.

4. A wheel according to claim 3, wherein:

said center hole of said wheel unit has a second wheel annular surface which extends radially inwardly from said first wheel surface;

said cap having a second cap annular surface which is a radially extending inner surface;

said cap being disposed on said wheel unit to form a second annular space between said second wheel annular surface and said second cap annular surface; and a radially extending magnet in said second annular space affixing said cap to said wheel.

5. A wheel according to claim 3, wherein:

said center hole of said wheel unit has a second wheel annular surface which extends radially inwardly from said first wheel surface;

said cap including a second cap annular surface which is a radially extending inner surface, said second cap surface including a second cap annular groove which opens axially outwardly;

said cap being disposed on said wheel unit to form a second annular space between said second wheel surface and said second cap groove; and an O-ring in said second annular space.

6. The wheel of claim 3 wherein said C-spring is entirely disposed between said first wheel annular groove and said first cap annular groove.

7. A wheel according to claim 6, wherein:

said center hole of said wheel unit has a second wheel annular surface which extends radially inwardly from said first wheel annular surface;

said cap having a second cap annular surface which is a radially extending inner surface;

said cap being disposed on said wheel unit to form a second annular space between said second wheel annular surface and said second cap surface; and a radially extending magnet in said second annular space affixing said cap to said wheel.

8. A wheel according to claim 6, wherein:

said center hole of said wheel unit has a second wheel annular surface which extends radially inwardly from said first wheel surface;

said cap having a second cap annular surface which is a radial extending inner surface;

said second cap surface having a second cap annular groove which opens axially outwardly;

said cap being disposed on said wheel unit to form a second annular space between said second wheel surface and said second cap groove; and an O-ring in said second annular space.

9. A wheel comprising:

a wheel unit including a center hole, the center hole including a first wheel annular surface which is an axially extending inner surface, said first wheel annular surface including a first wheel annular groove, the first wheel annular groove being of a semicircular cross sectional shape which opens radially inwardly;

a cap including a first cap annular surface which is an axially extending outer surface, said first cap annular surface including a first cap annular groove that is adapted for opposing the first wheel groove, the first cap annular groove being of a semicircular cross sectional shape that opens radially outwardly;

said cap being disposed on said wheel to form a first annular space between said first wheel annular groove and said first cap annular groove; and an O-ring disposed in said first annular space;

said cap including an axially extending central hole in a central portion of said cap; and said cap being without a hook axially extending from said cap for connecting said cap to the wheel.

10. The wheel of claim 9, wherein:

said center hole of said wheel has a second wheel annular surface which extends radially inwardly from said first wheel annular surface;

said cap having a second cap annular surface which is a radially extending inner surface;

said cap being disposed on said wheel unit to form a second annular space between said second wheel annular surface and said second cap surface; and a radially extending, magnet in said second annular space affixing said cap to said wheel.

11. The wheel of claim 9, wherein:

said center hole of said wheel unit has a second wheel annular surface which extends radially inwardly from said first wheel annular surface;

said cap including a second cap annular surface which is radially extending inner surface, said second cap surface including a second cap annular groove which opens axially outwardly;

said cap being disposed on said wheel unit to form a second annular space between said second wheel annular surface and said second cap annular groove; and an O-ring in said second annular space.

* * * * *